United States Patent [19]

Levy et al.

[11] Patent Number: 5,564,677
[45] Date of Patent: Oct. 15, 1996

[54] LINEAR ACTUATOR WITH FORCE SWITCH FOR DETECTING AXIAL LOAD

[75] Inventors: George L. Levy, Milpitas; John J. Boseman, San Jose; Hassan Ehsan, San Jose; Clyde T. Nieh, San Jose, all of Calif.

[73] Assignee: General Electric Company, San Jose, Calif.

[21] Appl. No.: 388,080

[22] Filed: Feb. 14, 1995

[51] Int. Cl.⁶ .............................. F16K 31/02; F16K 37/00
[52] U.S. Cl. .................................. 251/129.12; 251/129.13; 137/554
[58] Field of Search ................................. 137/554, 556; 251/129.11, 129.12, 129.13

[56] References Cited

U.S. PATENT DOCUMENTS

| | | | |
|---|---|---|---|
| 3,675,751 | 7/1972 | Fortner | 192/150 |
| 4,884,590 | 12/1989 | Eber et al. | 251/129.12 X |
| 4,898,362 | 2/1990 | Leon | 251/129.12 |
| 4,949,937 | 8/1990 | Waldrum | 251/129.11 |
| 5,137,257 | 8/1992 | Tice | 251/129.12 X |
| 5,152,308 | 10/1992 | Koch | 251/129.12 X |
| 5,156,373 | 10/1992 | Boyles et al. | 251/129.12 |

FOREIGN PATENT DOCUMENTS

| | | |
|---|---|---|
| 1197165 | 7/1965 | Germany . |
| 1928404 | 8/1970 | Germany . |
| 2136607 | 8/1972 | Germany . |
| 2417057 | 10/1975 | Germany . |
| 3638844 | 5/1988 | Germany . |

OTHER PUBLICATIONS

Buttler, "Reibungsfedern Bauart Ringfeder im Maschinenbau", Konstuktion, vol. 22, No. 4, 149–153 (1970).

*Primary Examiner*—Hoang Nguyen
*Attorney, Agent, or Firm*—James E. McGinness

[57] ABSTRACT

A linear actuator for actuating a valve or other control element. The actuator measures the in-line or axial force exerted on a drive sleeve after the valve disk engages the valve seat or back seat In response to detection of an axial force in excess of a predetermined threshold level, the motor is de-energized. The linear actuator includes a drive sleeve rotatably supported by bearings; a pack of friction springs for axially supporting the drive sleeve; a drive motor for driving rotation of the drive sleeve by way of gearing; a ball screw nut coupled inside and coaxial with the drive sleeve such that the ball screw nut rotates with the drive sleeve; a ball screw which translates axially in response to rotation of the ball screw nut; an anti-rotation device for preventing rotation of the ball screw during its translation; a switch for controlling the ON-OFF state of the motor; and a mechanical assembly for actuating the switch in response to a predetermined amount of axial deflection of the drive sleeve.

18 Claims, 9 Drawing Sheets

LINEAR ACTUATOR WITH FORCE SWITCH FOR DETECTING AXIAL LOAD

FILED OF THE INVENTION

This invention is generally related to improvements in electrical actuators for operating control elements such as valves and flaps. In particular, the invention relates to actuators which make linear movements for driving valves to open and close.

BACKGROUND OF THE INVENTION

Linear actuators for opening, closing or throttling a valve are known. One known embodiment of a linear actuator comprises the following main components: a motor, reduction gearing, a thrust unit, torque sensors, position indicating switches and a coupling to the control element, e.g., a valve. The thrust unit comprises a drive sleeve coupled to the motor via the reduction gearing, and a ball screw which converts the rotation of the drive sleeve into linear travel of a ball screw. The ball screw comprises a nut on which the drive sleeve is mounted and a screw which forms the upper part of the ball screw. The end of the ball screw is coupled to the valve stem via the coupling. An anti-rotation device prevents rotation of the ball screw during rotation of the drive sleeve. Other linear actuators have a threaded stem/stem nut arrangement in place of a ball screw.

In accordance with the principle of operation of these prior art linear actuators, the valve has a fully closed state, a fully open state and a multiplicity of partially open states therebetween corresponding to various degrees of throttling. The actuator has a multiplicity of position indicating switches which are triggered in sequence as the traveling ball screw arrives at the respective linear positions corresponding to the fully open state and the partially open states of the valve. These position indicating switches output signals which can be used to turn off the drive motor when a desired valve state, other than the fully closed state, is attained or to provide valve position indication.

To ensure full closure of the valve, the valve disk must be moved into contact with the valve seat with a certain minimum force. As soon as the valve is securely closed, the drive motor is turned off. This is accomplished using a torque measuring device which senses a predetermined increase in the torque in the motor drive shaft caused by stoppage of the ball screw when the valve disk engages the valve seat. The signal output by the torque measuring device in response to a predetermined level of torque is then used to turn off the motor. The built-in electromechanical brake or locking gear set locks the actuator position when the power supply is switched off.

Linear actuators in the above-described class are prone to unreliable and unpredictable operation which results in unrepeatable closing force. Thus, there is a need for linear actuators having improved reliability.

SUMMARY OF THE INVENTION

The present invention is a linear actuator having a force switch for controlling the ON-OFF state of the drive motor as a function of the axial deflection of the drive sleeve. The actuator is characterized by the incorporation of means for measuring the in-line or axial force exerted on the drive sleeve as the valve closes or opens, e.g., as the valve closure force increases or when the valve disk is backseated. In response to detection of an axial force in excess of a predetermined threshold level, the motor is de-energized.

The linear actuator in accordance with the preferred embodiment of the invention comprises a drive sleeve having a centerline; bearings for rotatably supporting the drive sleeve such that the drive sleeve is rotatable about the centerline; a pack of friction springs for axially supporting the drive sleeve; a stationary support structure which supports the bearings and spring pack; gearing coupled to the drive sleeve; a drive motor for driving rotation of the drive sleeve by way of the gearing; a ball screw drive mechanism having a nut coupled to the drive sleeve and having a ball screw which translates along the centerline in response to rotation of the ball screw nut; an anti-rotation device for preventing rotation of the ball screw during its translation; a switch connected to control the ON-OFF state of the motor; and a mechanical assembly for actuating the switch to turn off the motor in response to a predetermined amount of axial deflection of the drive sleeve.

In accordance with the foregoing preferred embodiment, the switch serves as a force switch which measures the axial force exerted when the valve disk is seated and the motor is still running, that is, when the drive sleeve is rotating relative to a stopped ball screw. The axial force can be determined as a function of the axial deflection of the spring pack, which has a known spring characteristic. When the drive sleeve deflects axially in opposition to resistance of the springs, a shaft of the force switch unit rotates. The angle of shaft rotation is proportional to spring pack deflection, which is in turn proportional to the actuator axial force. An adjustable cam on the force switch shaft is positioned to the desired force switch setting. In particular, the angular position of the cam at which the state of the force switch is changed can be adjusted so that switch actuation occurs when the axial force applied to the springs by the drive sleeve reaches the maximum allowable level corresponding to the operating point at which motor shutoff is desired.

When the ball screw is driven against its stroke limit (valve seat) during actuator operation, the actuator's force increases to the force switch trip setting. When the force switch is tripped, the power supply to the drive motor is shut off. Due to the combination of friction springs and the force switch, the actuator and the valve are protected from inadvertent increases of force. The built-in electromechanical brake on the motor locks the actuator position when the power supply is switched off.

DETAILED DESCRIPTION OF THE PREFERRED EMBODIMENTS

Figure 1:
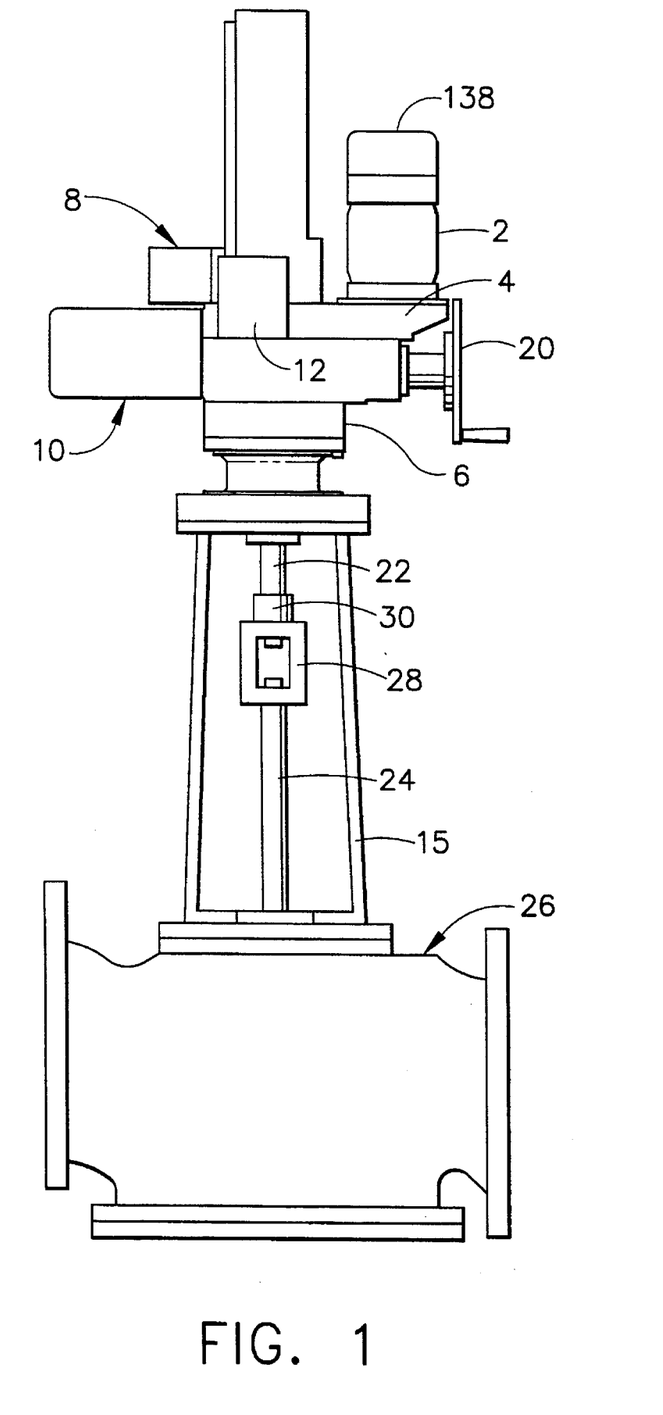
FIG. 1 is a schematic elevational view of a linear actuator in accordance with the present invention coupled to a valve.

Referring to FIG. 1, the linear actuator in accordance with the present invention consists of the following main components: motor 2, reduction gears 4, thrust unit 6, force switch unit 8 and position indicating switch unit 10. The force switches, position indicating switches and motor are connected to junctions inside the electrical connection box 12. The actuator is mounted on its associated valve 26 via a yoke 15.

Figures 2, 4D:
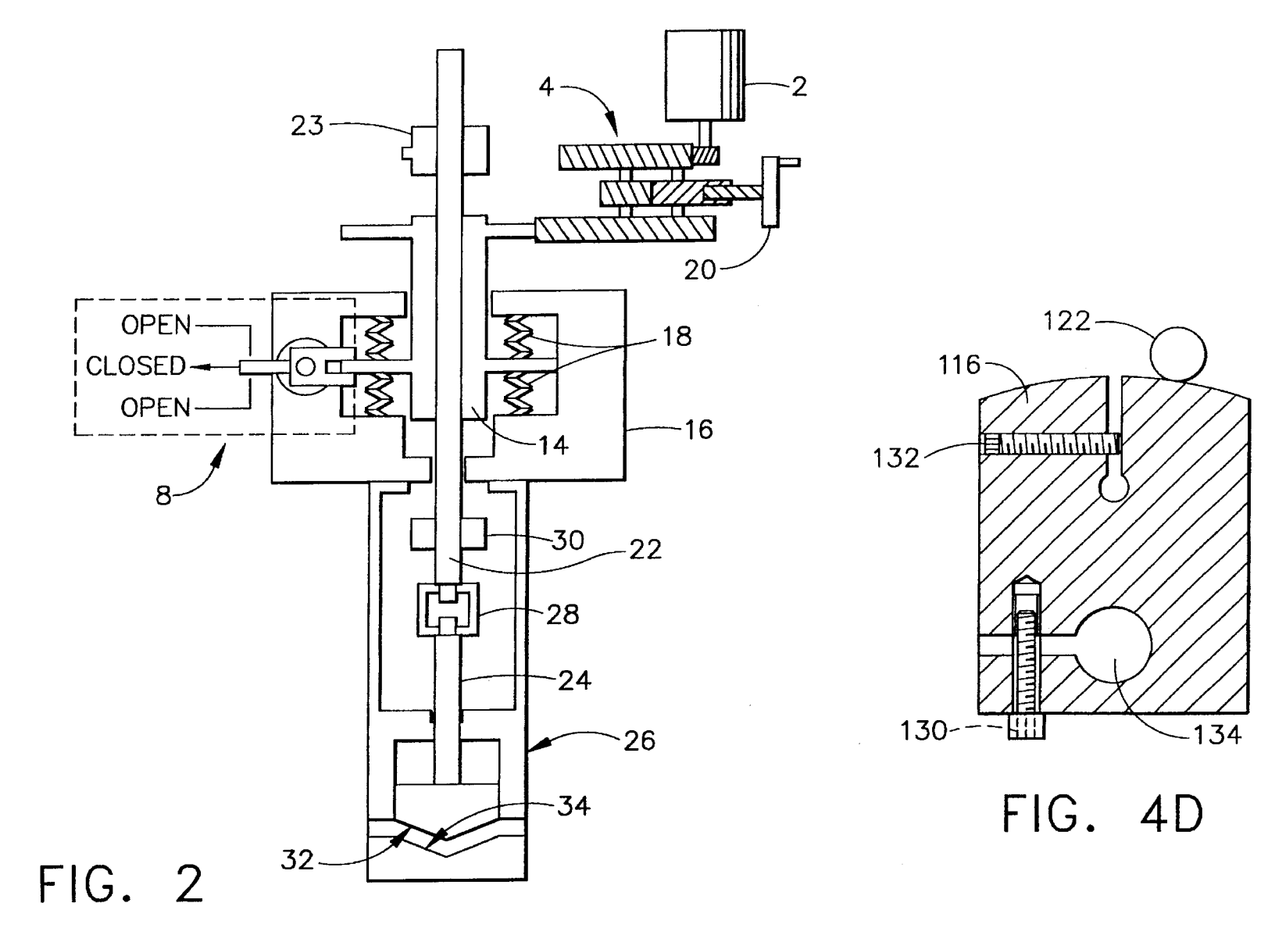
FIG. 2 is a schematic sectional view of a linear actuator in accordance with the present invention coupled to a valve.
FIG. 4D is a sectional elevational view of a force cam incorporated in the force switch unit shown in FIG. 4A.

The thrust unit 6, as schematically depicted in FIG. 2, comprises a drive sleeve 14 which is rotatably mounted inside a housing 16. The drive sleeve 14 is restrained against axial deflection in both directions by a spring pack 18. The drive sleeve 14 is driven to rotate by motor 2 via the reduction gears 4.

In response to rotation of drive sleeve 14, a ball screw 22 of a ball screw drive mechanism is translated axially. As shown in FIGS. 1 and 2, ball screw 22 is coupled to a valve stem 24 of a valve 26 by a coupling 28. Axial displacement of the ball screw 22 can be limited by a mechanical limit stop 30. Rotation is prevented by anti-rotation device 23. When the ball screw is sufficiently extended, the valve disk 32 is pressed firmly against the valve seat 34, thereby fully closing valve 26. Alternatively, ball screw 22 can be retracted until valve 26 is fully opened.

A handwheel 20 allows for manual operation of the actuator even when the voltage supply is switched off. If inadvertent motor operation occurs during manual operation, no adverse impact to operator or personnel will result due to the differential gearing. In order to move the ball screw, the handwheel release lever (not shown) must be pressed and held down prior to operation. This assures that the motor is not disengaged from the gearing. Turning the handwheel 20 causes the ball screw 22 to displace in a direction dependent on the direction of wheel rotation.

When the valve is fully closed, further downward displacement of ball screw 22 is halted. Since the motor 2 is still running, the drive sleeve 14 continues to rotate relative to the now stationary ball screw. This causes the drive sleeve to travel up the ball screw in opposition to the resistance of the spring pack 18. The force switch unit 8 comprises a switch which is adjusted to turn off the motor when the upward axial deflection of drive sleeve 14 reaches a predetermined value.

In accordance with the present invention, the spring characteristic of the spring pack must be determined prior to calibration of the force switch. If the spring characteristic is known, then a known axial deflection of the drive sleeve relative to housing 16 will correspond to a known axial force being exerted by the drive sleeve. The force switch is adjusted to actuate when the axial force being exerted by the drive sleeve exceeds a maximum allowable level. In response to actuation of the force switch, the power supply to motor 2 is shut off.

Figure 3:
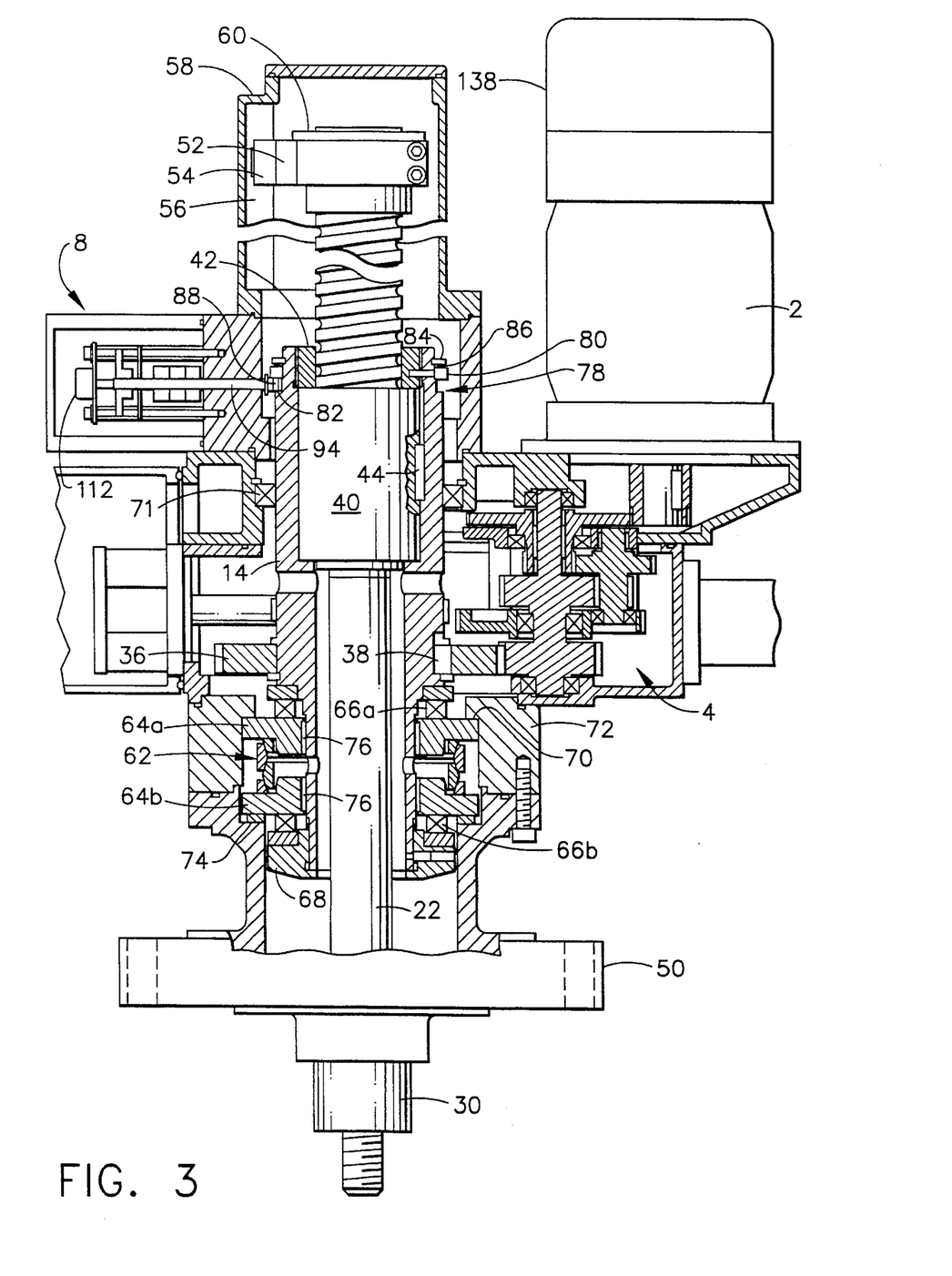
FIG. 3 is sectional elevational view of the linear actuator in accordance with the preferred embodiment of the invention, with the position indicating switches not shown.

The linear actuator in accordance with the preferred embodiment of the invention is shown in more detail in FIG. 3. A gear wheel 36 is coupled to the drive sleeve 14 by a key 38. The gear wheel 36 is driven to rotate by motor 2 via reduction gears 4. This gearing arrangement is conventional and will not be described in detail here for the sake of economy.

A ball screw nut 40 is held inside a circular cylindrical bore of drive sleeve 14 by a bushing 42. The ball screw nut 40 is coupled to drive sleeve 14 by a key 44 such that the ball screw nut rotates with the drive sleeve. The ball screw nut 40 has an internal spiral raceway which guides the balls of the ball screw drive mechanism in cooperation with the opposing external spiral raceway on the ball screw 22.

The lower portion of the ball screw has no raceway and is slidably supported by a split ring bearing (not shown) seated in an annular recess formed in a bushing (not shown), which is in turn bolted to the flange 50 of the actuator housing. The upper portion of the ball screw also has no raceway and has an anti-rotation device clamped near its end. The clamping device 52 carries a roller 54 which travels in a vertical slot 56 formed in the casing 58. Downward travel of clamping device 52 is limited by a limit stop 60. Upward travel is limited by limit stop 30.

The walls of slot 56 laterally restrain the roller 54 so that the ball screw 22, and the valve stem 24 coupled thereto, cannot rotate in response to rotation of the drive sleeve 14. As a result, the rotation of drive sleeve 14 is converted into translation of ball screw 22.

The drive sleeve 14 is axially supported inside the thrust unit by a spring pack comprising a plurality of friction ring springs 62 sandwiched between a pair of disks 64a and 64b. The drive sleeve is rotatably coupled to the upper disk 64a by an axial roller bearing 66a. The drive sleeve is rotatably coupled to the lower disk 64b by an axial roller bearing 66b and an adjusting ring 68 attached to the lower end of the drive sleeve. The upper disk 64a is limited in its upward travel by an annular shoulder 70 of the intermediate ring 72 of the actuator housing. The lower disk 64b is limited in its downward travel by an annular shoulder 74 of the flange 50. Each of disks 64a and 64b has a needle sleeve 76 which is slidable relative to the drive sleeve 14. Thus, the drive sleeve 14 can slide upward relative to disk 64a when a sufficient upward axial force is exerted on the friction springs. Likewise, the drive sleeve 14 can slide downward relative to disk 64b when a sufficient downward axial force is exerted on the friction springs. During either upward or downward deflection of drive sleeve 14, the distance between disks 64a and 64b decreases, causing the friction springs to compress. The axial force being exerted is proportional to the spring deflection and can be determined from the spring deflection and the spring characteristic.

The object of the present invention is to turn off the drive motor 2 when a maximum allowable level of axial force is attained. Because this maximum allowable axial force corresponds to a maximum allowable axial deflection, the force switch unit 8 is used to detect that maximum allowable axial deflection. As seen in FIG. 3, the force switch unit engages an annular slot 78 formed between a ring 80 and an annular shoulder 82 on the drive sleeve. The ring 80 is held in place by a retaining ring 84 with a bearing washer 86 arranged therebetween. The force switch unit comprises a bearing 88 which rides in the annular slot as the drive sleeve is rotated. If drive sleeve 14 deflects axially, then the bearing 88, which is axially restrained by the annular slot 78, will also be deflected in the same axial direction.

Figure 4A:
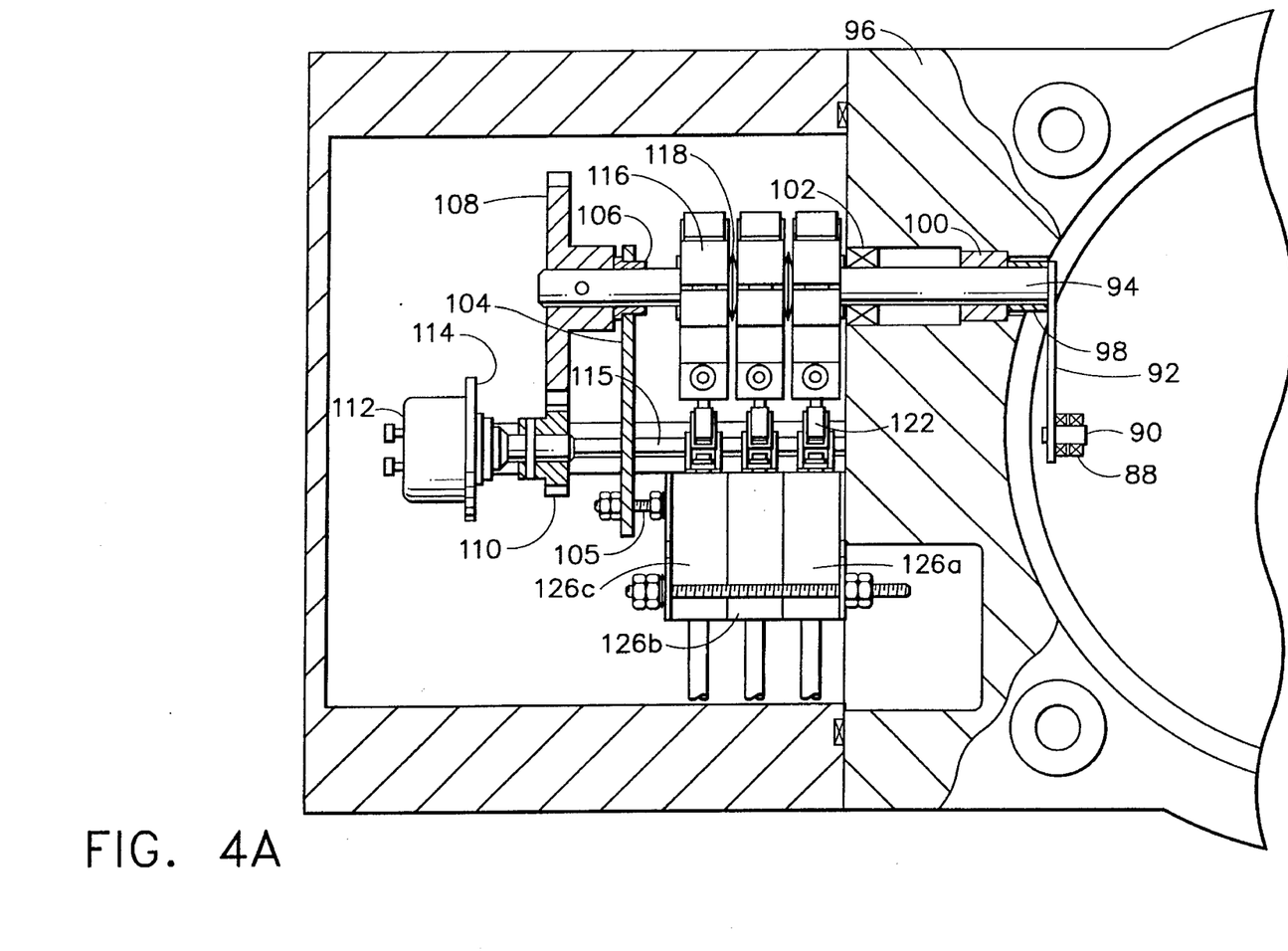
FIG. 4A is sectional plan view of the force switch unit incorporated in the preferred embodiment of the linear actuator shown in FIG. 3.

The structural details of the force switch unit are shown in detail in FIGS. 4A–4D. Referring to FIG. 4A, the bearing 88 rotatably supports a pivot pin 90 which is attached to the one end of a lever arm 92. The other end of lever arm 92 is attached to the end face of a cam shaft 94. One portion of the cam shaft 94 is rotatably mounted in a bore in the intermediate flange 96 of the actuator housing by means of a sleeve 98, a bushing 100 and a shaft sealing ring 102. Another portion of the cam shaft 94 is rotatably supported by a fixed plate 104 via a bushing collar 106. Plate 104 is supported by four pins 105, only one of which is shown in FIG. 4A.

A spur gear 108 is mounted on the end of the cam shaft opposite to the lever arm 92. Spur gear 108 engages a spur gear 110, which is coupled to a potentiometer 112 mounted on a fixed plate 114. Plate 114 is supported on plate 104 by two pins 115, only one of which is shown in FIG. 4A.

Figure 4B:
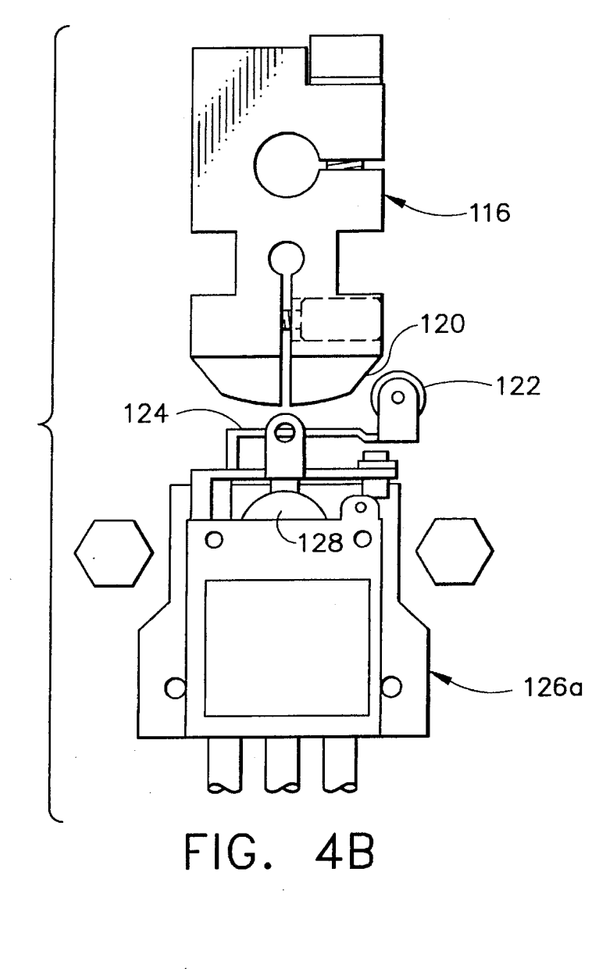
FIGS. 4B and 4C are elevational views of oppositely oriented force switches incorporated in the force switch unit shown in FIG. 4A.
Figure 4C:
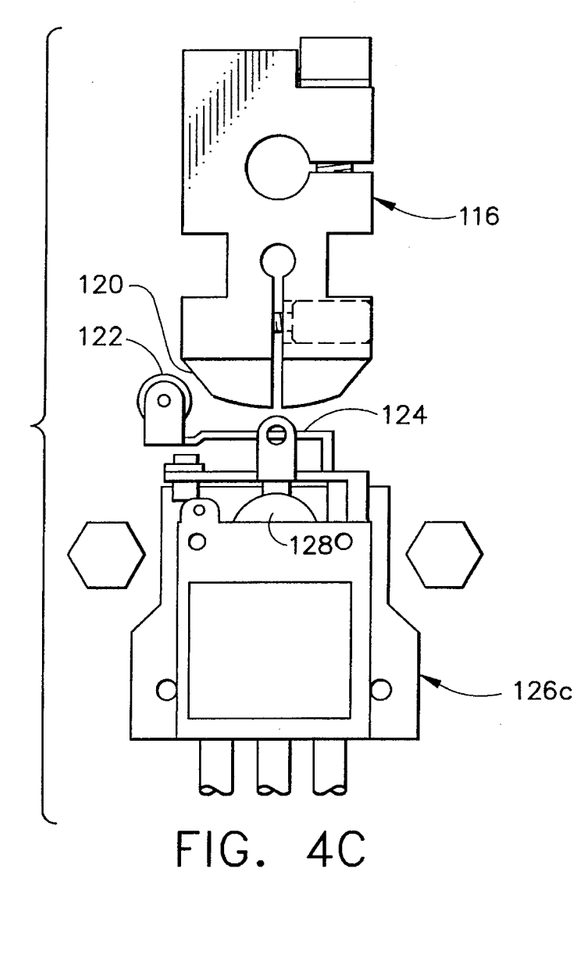

Three force cams 116 are secured to the cam shaft 94 at equal intervals determined by intermediate spacers 118. As seen in FIGS. 4B and 4C, each force cam 116 has a camming surface 120 at its distal end. The camming surface of each cam travels along an arc when the cam shaft 94 is rotated. Rotation of cam shaft 94 in turn occurs when the level arm 92 is swiveled due to axial deflection of the drive sleeve 14 and bearing 88 coupled thereto. Each cam 116 is positioned to engage a switch roller 122 pivotably mounted on the distal end of a contact arm 124 of a corresponding microswitch 126a–c. Each microswitch has a contact block 128 which is moved from a first position whereat the switch does not turn off the motor to a second position whereat the switch turns off the motor as the cam rotates through a predetermined angle of rotation.

Microswitches 126a and 126b are oriented as shown in FIG. 4B and used for the direction "valve closed" (one of these for redundancy); the third microswitch 126c is oriented as shown in FIG. 4C and used for the opening direction. Comparing FIGS. 4B and 4C, it can be seen that microswitch 126a will be actuated to turn off the motor when the cam shaft rotates in a direction corresponding to upward axial deflection of the drive sleeve, whereas microswitch 126c will be actuated to turn off the motor when the cam shaft rotates in the opposite direction corresponding to downward axial deflection of the drive sleeve. The power supply to motor 2 is cut off in response to actuation of any one of microswitches 126a–c.

Figure 7:
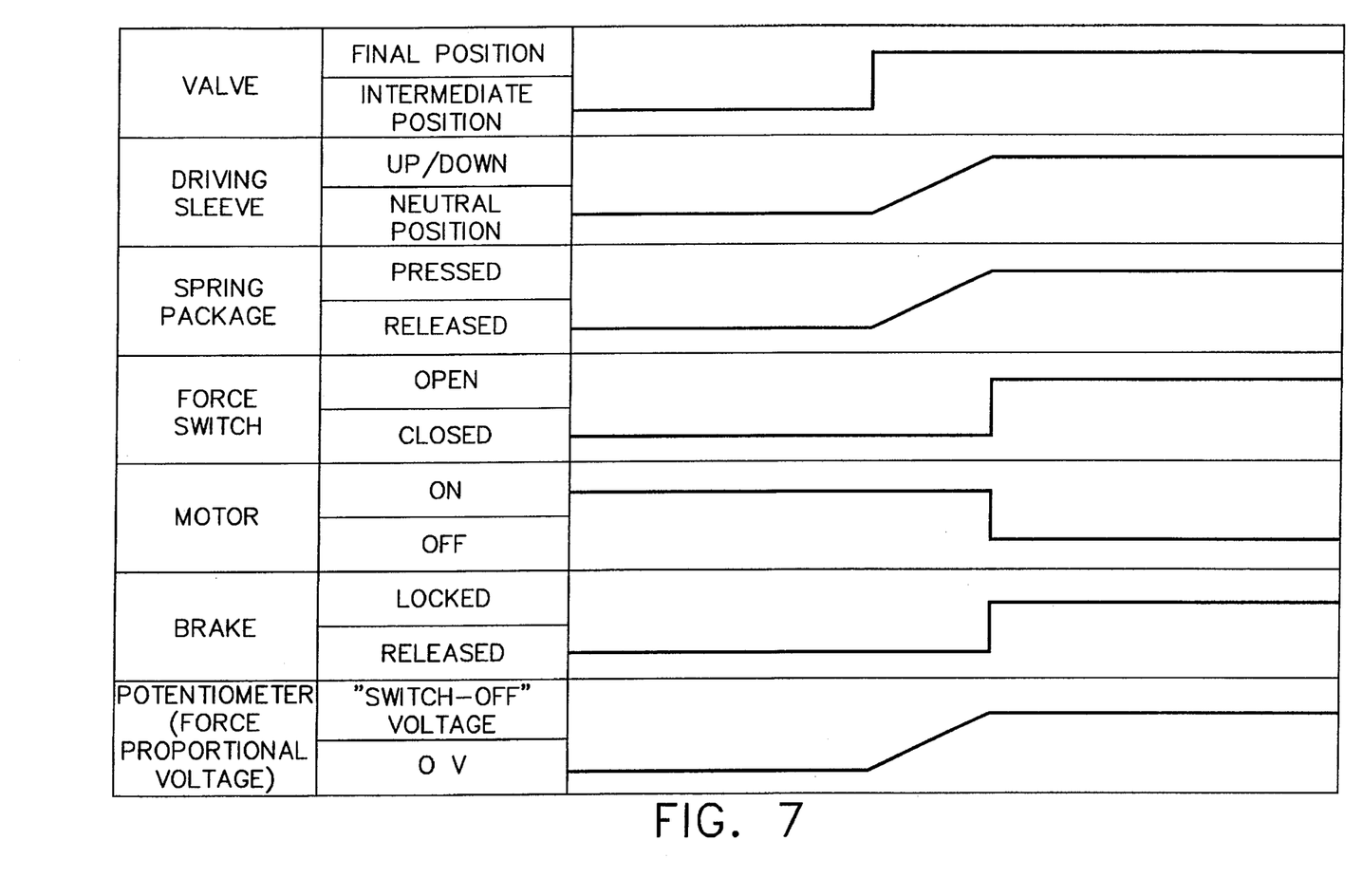
FIG. 7 is a functional diagram showing the operating states of the key components of the linear actuator of the invention.

When the actuator has driven the valve disk 32 (see FIG. 2) into its final position, the friction springs 62 are compressed and the drive sleeve 14 is shifted slightly upward or downward (depending on whether the final position of the valve disk is up or down) within the spring deflection. The shifted distance depends on the characteristic of the friction springs. The distance is therefore an indicator of the force which is being transferred axially in the ball screw 22. The spring deflection is mechanically converted into rotation of the cam shaft 94 via the above-described lever/shaft mechanism and transferred to the adjustable (turn-able) cams. The cams respectively operate the three independent microswitches, i.e., force switches. The respective operating states for the valve, drive sleeve, spring pack, force switch, motor, brake, and potentiometer are shown in FIG. 7.

The conductive potentiometer 112 is driven by toothed spur gear 108 located on the rear end of cam shaft 94. Since the characteristic of the friction springs 62 is determined by the spring manufacturer, the potentiometer output voltage (which depends on the spring deflection) is used for the adjustment of the force switching contact.

Prior to adjustment of the force switching contacts, the valve should be partially open to unseat the valve disk 32. Then the cover of the force switch unit is removed and potentiometer 112 is adjusted to zero. During the adjustment, a diagram showing the force characteristic for the spring pack should be available. The adjustment is carried out as follows: (1) connect a voltmeter to the terminals of the potentiometer; (2) drive the valve disk into its seat by manually turning the actuator's handwheel; (3) when the valve disk has reached its seat, continue turning the handwheel slowly until the voltmeter indicates the voltage proportional to the force desired; (4) loosen the clamping screw 130 (see FIG. 4D) of the force cam 116; (5) turn the force cam 116 carefully until it actuates the switching contacts (contact either open or closed); and (6) retighten the clamping screw 130 to clamp the force cam onto the cam shaft (not shown in FIG. 4D) which penetrates the fastening hole 134. Screw 132 can be used for fine adjustment.

Figure 6:
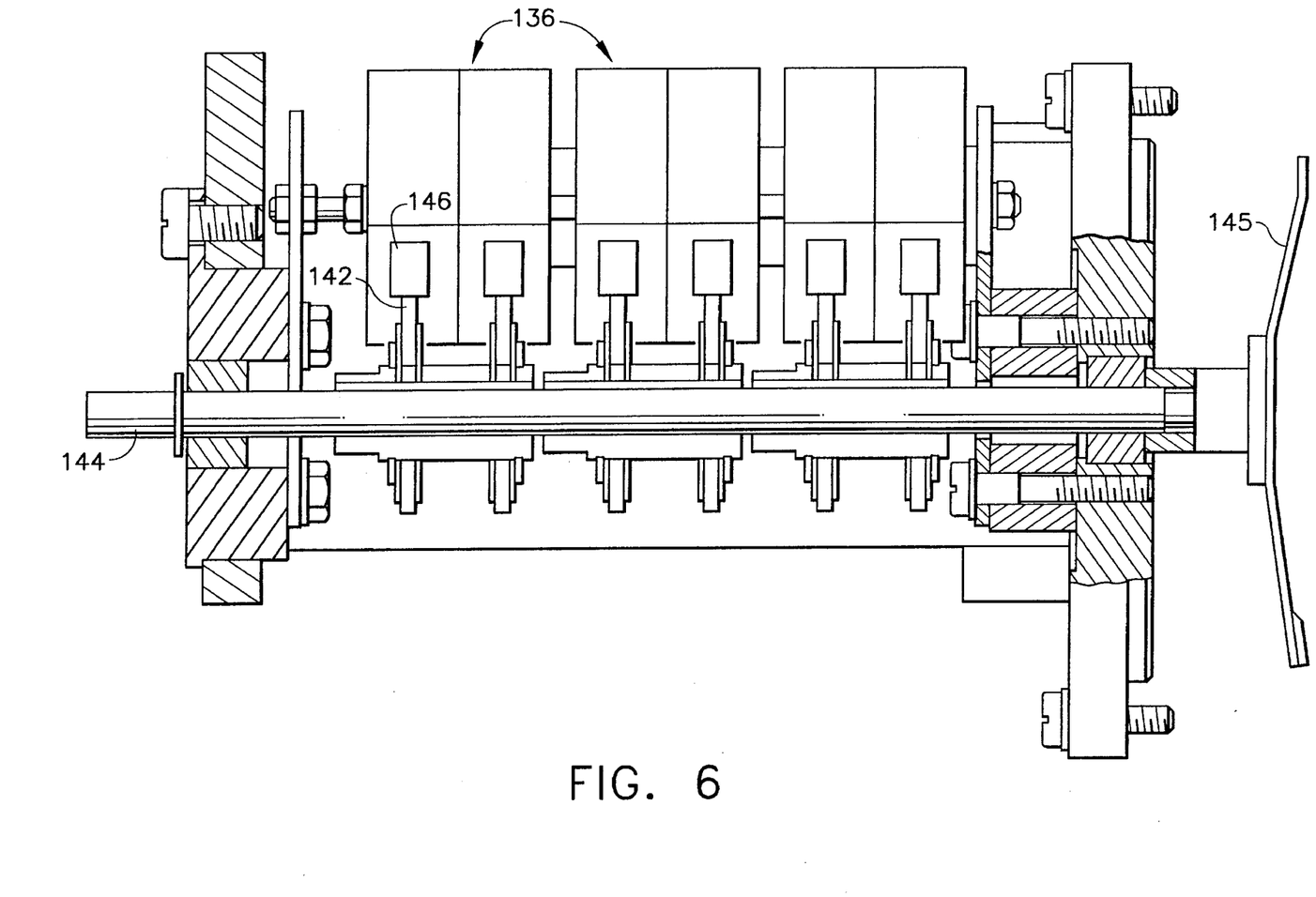
FIG. 6 is partly sectional plan view of the position indicating switch unit incorporated in the linear actuator of the invention.

The linear actuator of the invention also includes an array of position indicating switches 136, shown in FIG. 6. Switches 136 are microswitches similar in structure to those used in the force switch unit previously described. Microswitches 136 are activated corresponding to different axial positions of the ball screw. Each microswitch 136 is actuated by a corresponding cam 142 mounted on a rotatable cam shaft 144. In particular, the cam bears against and displaces a switch roller 146 mounted on the end of the contact arm (not visible in FIG. 6). The cam shaft is rotatably mounted in conventional fashion as seen in FIG. 6.

Figure 5:
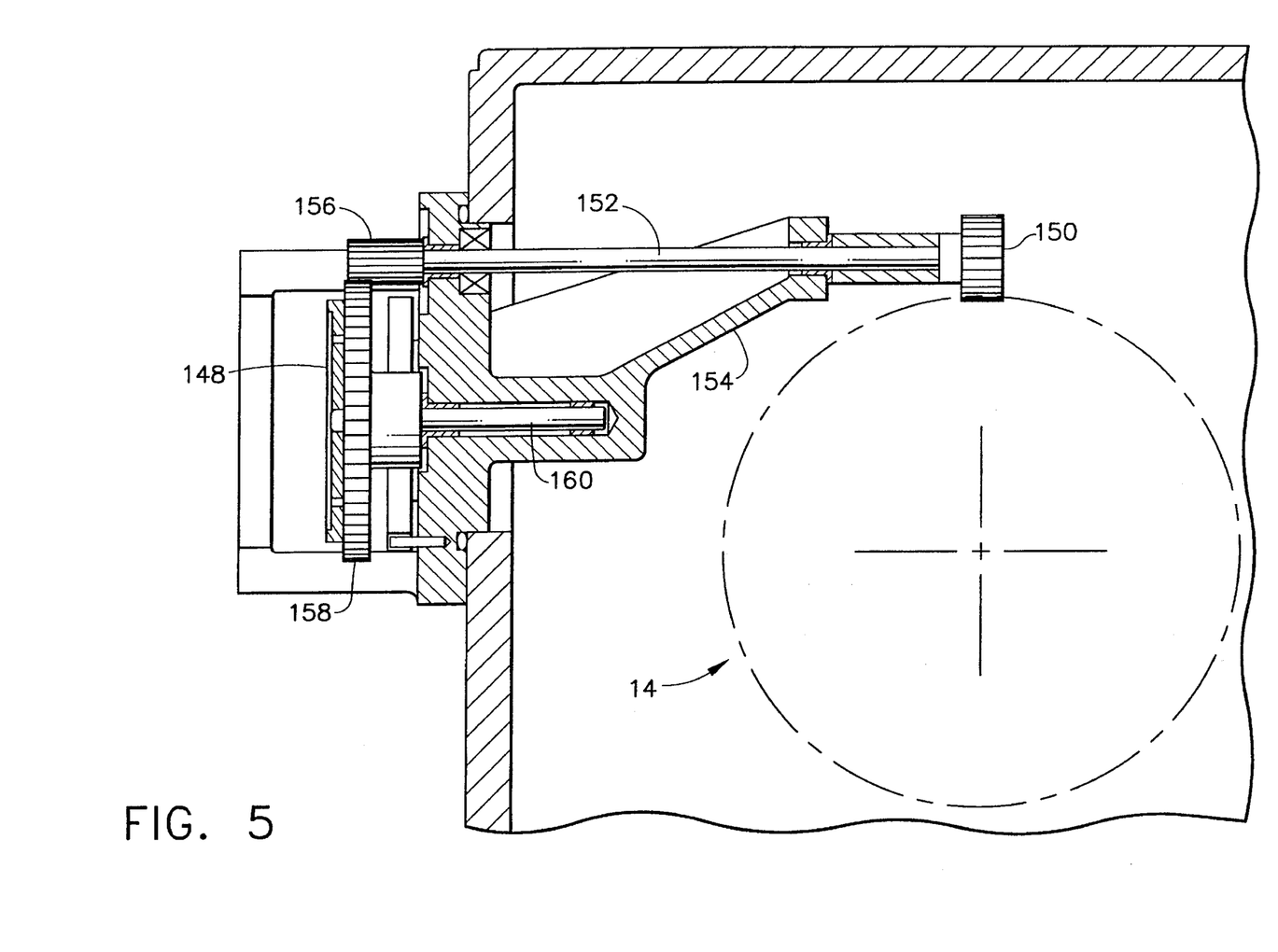
FIG. 5 is sectional plan view of the drive assembly for the position indicating switches incorporated in the linear actuator of the invention.

The end of cam shaft 144 has a spring 145 attached on the endface thereof. Spring 145 couples with a friction plate 148, shown in FIG. 5. The friction plate 148 rotates in response to rotation of the drive sleeve 14. The angle of rotation of friction plate 148 is linearly proportional to the angle of rotation of the drive sleeve, which is in turn linearly proportional to the axial distance traveled by the ball screw 22. The drive sleeve has a threaded outer circumferential surface which engages a worm gear 150 mounted on the end of a shaft 152. Shaft 152 is rotatably supported in a flange 154 in conventional manner. The other end of shaft 152 has a pinion gear 156 connected thereto. Pinion gear 156 engages a gear wheel 158. The gear wheel is mounted on a shaft 160 and carries the friction plate 148 on its face.

Gear wheel 158, and friction plate 148 thereon, are driven to rotate in response to rotation of the drive sleeve. This in turn causes the cam shaft 144 (see FIG. 6) to rotate. The cams 142 can be adjusted to actuate the position indicating switches at predetermined drive sleeve angles of rotation corresponding to desired axial positions of the ball screw. For example, in accordance with the preferred embodiment of the present invention, it is desirable to turn off the actuator motor slightly prior to the valve disk reaching the fully open or backseated position. Because it is undesirable and unnecessary to move the valve to the final open position with great axial force, a position indicating switch can be used instead of a force switch to indicate the nearly fully open valve position. The force switch 126c (see FIG. 4A) can be adjusted to turn off the motor in the event that the motor is not turned off when the valve disk reaches the nearly fully open position and the drive sleeve is axially deflected downward with a minimal opening force as the valve disk is backseated.

Figure 8:
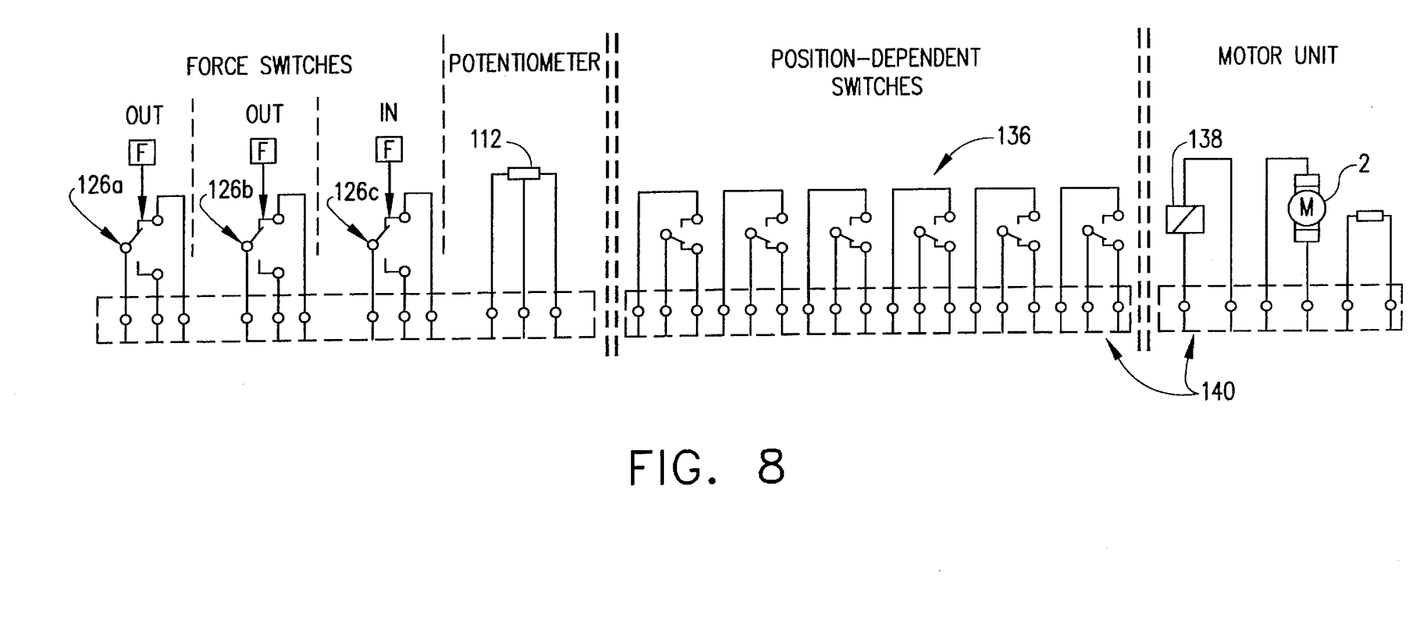
FIG. 8 is a basic wiring diagram showing electrical connection of the force switch unit, position indicating switch unit and motor unit to the terminals.

Position indicating switches 136, force switches 126a–c, potentiometer 112, electromechanical brake 138 and motor 2 are connected to a terminal strip 140, as shown in FIG. 8.

The preferred embodiment of the invention has been disclosed for the purpose of illustration. Variations and modifications of the disclosed structure which do not depart we claim:

1. A linear actuator comprising:

a drive sleeve having a centerline and a circumferential shoulder on its outer periphery;

a ring attached to said drive sleeve and separated from said shoulder by an annular slot;

bearing means for rotatably supporting said drive sleeve such that said drive sleeve is rotatable about said centerline spring means for axially supporting said drive sleeve;

a stationary support structure which supports said bearing means and said spring means;

gearing coupled to said drive sleeve;

a drive motor for driving rotation of said drive sleeve by way of said gearing;

a ball screw drive mechanism having a nut coupled to the drive sleeve and having a ball screw which translates along the centerline in response to rotation of the ball screw nut;

means for preventing rotation of said ball screw during translation thereof;

a first switch connected to de-energize said motor when said first switch is actuated; and an actuator assembly for actuating said first switch when axial deflection of said drive sleeve reaches a predetermined amount, wherein said actuator assembly comprises a member interposed in said annular slot, said member fitting into said slot so that said member is not deflected during rotation without axial deflection of said drive sleeve and said member deflects during axial deflection of said drive sleeve.

2. The linear actuator as defined in claim 1, further comprising a second switch connected to de-energize said motor when said second switch is actuated, and an actuator assembly for actuating said second switch when said drive sleeve rotates to a predetermined angular position.

3. The linear actuator as defined in claim 2, wherein said ball screw is coupled to a valve stem of a valve, said valve being fully open when axial deflection of said drive sleeve reaches said predetermined amount and being nearly fully closed when said drive sleeve rotates to said predetermined angular position.

4. The linear actuator as defined in claim 1, wherein said spring means comprises a pack of friction ring springs.

5. A linear actuator comprising:

a drive sleeve having a centerline;

bearing means for rotatably supporting said drive sleeve such that said drive sleeve is rotatable about said centerline spring means for axially supporting said drive sleeve;

a stationary support structure which supports said bearing means and said spring means;

gearing coupled to said drive sleeve;

a drive motor for driving rotation of said drive sleeve by way of said gearing;

a ball screw drive mechanism having a nut coupled to the drive sleeve and having a ball screw which translates along the centerline in response to rotation of the ball screw nut;

means for preventing rotation of said ball screw during translation thereof;

a first switch connected to de-energize said motor when said first switch is actuated; and an actuator assembly for actuating said first switch when axial deflection of said drive sleeve reaches a predetermined amount;

wherein said actuator assembly comprises a pin coupled to bearing means engaged in an annular slot on the outer periphery of said drive sleeve.

6. The linear actuator as defined in claim 5, wherein said actuator assembly further comprises a shaft and a lever arm, one end of said lever arm being attached to said shaft and the other end of said lever arm having said pin attached thereto, said shaft being rotatably supported to rotate in response to axial deflection of said drive sleeve.

7. The linear actuator as defined in claim 6, wherein said actuator assembly further comprises a cam mounted on said shaft, said cam being arranged to actuate said first switch when axial deflection of said drive sleeve equals said predetermined amount.

8. The linear actuator as defined in claim 6, further comprising a potentiometer and gearing for coupling said potentiometer to said shaft.

9. A linear actuator comprising:

a drive sleeve having a centerline;

bearing means for rotatably supporting said drive sleeve such that said drive sleeve is rotatable about said centerline;

spring means for axially supporting said drive sleeve;

a stationary support structure which supports said bearing means and said spring means;

gearing coupled to said drive sleeve;

a drive motor for driving rotation of said drive sleeve by way of said gearing;

a ball screw drive mechanism having a nut coupled to the drive sleeve and having a ball screw which translates along the centerline in response to rotation of the ball screw nut;

means for preventing rotation of said ball screw during translation thereof;

a first switch connected to de-energize said motor when said first switch is actuated;

a shaft;

a coupling mechanism for rotating said shaft in response to axial deflection of said drive sleeve; and a cam mounted on said shaft, said cam being arranged to actuate said first switch when axial deflection of said drive sleeve equals a predetermined amount.

10. The linear actuator as defined in claim 9, further comprising a potentiometer and gearing for coupling said potentiometer to said shaft.

11. A linear actuator comprising:

a screw drive mechanism comprising a nut and a screw coupled such that said screw translates along its centerline in response to rotation of said nut about said centerline;

a drive gear driven by a motor;

a drive sleeve for converting rotation of said drive gear into rotation of said nut, said drive sleeve having a circumferential shoulder on its outer periphery;

a ring mounted on said drive sleeve for forming an annular slot between said ring and said shoulder;

bearing means for rotatably supporting said drive sleeve such that said drive sleeve is rotatable about said centerline;

spring means arranged to resist axial deflection of said drive sleeve;

a stationary support structure which supports said bearing means and said spring means;

means for preventing rotation of said screw during translation thereof;

a first switch for controlling the ON-OFF state of said motor; and an actuator assembly for actuating said first switch to turn off said motor when axial deflection of said drive sleeve relative to said support structure reaches a predetermined amount, wherein said actuator assembly comprises a member interposed in said annular slot, said member fitting into said slot so that said member is not deflected during rotation without axial deflection of said drive sleeve and said member deflects during axial deflection of said drive sleeve.

12. The linear actuator as defined in claim 11, further comprising:

a second switch for controlling the ON-OFF state of said motor; and an actuator assembly for actuating said second switch to turn off said motor when said drive sleeve rotates to a predetermined angular position.

13. The linear actuator as defined in claim 12, wherein said screw is coupled to a valve stem of a valve, said valve being fully open when axial deflection of said drive sleeve reaches said predetermined amount and being nearly fully closed when said drive sleeve rotates to said predetermined angular position.

14. The linear actuator as defined in claim 11, wherein said spring means comprises a pack of friction ring springs.

15. The linear actuator as defined in claim 11, wherein said screw is a ball screw and said nut is a ball screw nut.

16. A linear actuator comprising:

a screw drive mechanism comprising a nut and a screw coupled such that said screw translates along its centerline in response to rotation of said nut about said centerline;

a drive gear driven by a motor;

a drive sleeve for converting rotation of said drive gear into rotation of said nut;

bearing means for rotatably supporting said drive sleeve such that said drive sleeve is rotatable about said centerline;

spring means arranged to resist axial deflection of said drive sleeve;

a stationary support structure which supports said bearing means and said spring means;

means for preventing rotation of said screw during translation thereof;

a first switch for controlling the ON-OFF state of said motor; and an actuator assembly for actuating said first switch to turn off said motor when axial deflection of said drive sleeve relative to said support structure reaches a predetermined amount, wherein said actuator assembly comprises a pin coupled to bearing means engaged in an annular slot on the outer periphery of said drive sleeve.

17. The linear actuator as defined in claim 16, wherein said actuator assembly further comprises:

a shaft having a cam mounted thereon;

means for rotatably supporting said shaft;

a lever arm, one end of said lever arm being attached to said shaft and the other end of said lever arm having said pin attached thereto, wherein said shaft rotates in response to axial deflection of said drive sleeve and said cam is arranged to actuate said first switch when axial deflection of said drive sleeve equals said predetermined amount.

18. The linear actuator as defined in claim 17, further comprising a potentiometer and gearing for coupling said potentiometer to said shaft.

* * * * *